(12) United States Patent
Bassi et al.

(10) Patent No.: US 8,055,070 B2
(45) Date of Patent: Nov. 8, 2011

(54) COLOR AND GEOMETRY DISTORTION CORRECTION SYSTEM AND METHOD

(75) Inventors: Zorawar S. Bassi, Markham (CA); Vladimir Lachine, Toronto (CA)

(73) Assignee: Geo Semiconductor Inc., Santa Clara, CA (US)

( * ) Notice: Subject to any disclaimer, the term of this patent is extended or adjusted under 35 U.S.C. 154(b) by 962 days.

(21) Appl. No.: 11/649,765

(22) Filed: Jan. 5, 2007

(65) Prior Publication Data
US 2008/0166043 A1 Jul. 10, 2008

(51) Int. Cl.
G06K 9/00 (2006.01)
G06K 9/40 (2006.01)
(52) U.S. Cl. ......... 382/167; 382/274; 382/275; 382/254
(58) Field of Classification Search .................. 382/254, 382/255, 274, 275
See application file for complete search history.

(56) References Cited

U.S. PATENT DOCUMENTS

| | | | |
|---|---|---|---|
| 4,472,732 A | 9/1984 | Bennett et al. | |
| 4,635,532 A | 1/1987 | Tanino et al. | |
| 4,908,874 A | 3/1990 | Gabriel | |
| 4,975,976 A | 12/1990 | Kimata et al. | |
| 5,175,808 A | 12/1992 | Sayre | |
| 5,204,944 A | 4/1993 | Wolberg et al. | |
| 5,335,097 A * | 8/1994 | Murakami | 358/520 |
| 5,452,019 A | 9/1995 | Fukuda et al. | |
| 5,594,676 A | 1/1997 | Greggain et al. | |
| 5,808,623 A | 9/1998 | Hamburg | |
| 5,848,199 A | 12/1998 | Naqvi | |
| 6,005,582 A | 12/1999 | Gabriel et al. | |
| 6,016,152 A | 1/2000 | Dickie | |
| 6,061,477 A | 5/2000 | Lohmeyer et al. | |
| 6,097,855 A | 8/2000 | Levien | |
| 6,239,886 B1 | 5/2001 | Klassen et al. | |
| 6,243,059 B1 | 6/2001 | Greene et al. | |
| 6,292,157 B1 | 9/2001 | Green et al. | |
| 6,292,193 B1 | 9/2001 | Perry et al. | |
| 6,377,317 B1 | 4/2002 | Kiga et al. | |
| 6,504,551 B1 | 1/2003 | Takashima et al. | |
| 6,603,452 B1 | 8/2003 | Serita | |

(Continued)

FOREIGN PATENT DOCUMENTS

EP 0920671 B1 6/1999

(Continued)

OTHER PUBLICATIONS

Stephen Wolf, "Color correction matrix for digital still and video imaging system", NTIA TM-04-406, Dec. 2003.*

(Continued)

*Primary Examiner* — Samir Ahmed
*Assistant Examiner* — Li Liu
(74) *Attorney, Agent, or Firm* — Sughrue Mion, PLLC (57) ABSTRACT

Systems and methods for correcting color and geometry in an image are disclosed. In one example, image data are received in one format and are then converted to another format to perform color correction. In another example, geometric corrections are first applied to each color component of an image data to correct for different distortions including lateral chromatic aberrations. Next, color distortion corrections are performed to correct for each color component of the image data independently. In one particular exemplary embodiment, color distortion corrections are applied using surface function representation of a grid data transformation relating uncorrected values to corrected values.

33 Claims, 7 Drawing Sheets

U.S. PATENT DOCUMENTS

| | | | |
|---|---|---|---|
| 6,753,907 | B1 | 6/2004 | Sukthankar et al. |
| 6,774,953 | B2 | 8/2004 | Champion et al. |
| 6,778,184 | B2 | 8/2004 | Arita et al. |
| 6,813,590 | B1 * | 11/2004 | Crusius ............................. 703/2 |
| 6,844,881 | B1 | 1/2005 | Chen et al. |
| 6,844,883 | B2 | 1/2005 | Bakhmutsky |
| 7,030,846 | B2 | 4/2006 | Lee et al. |
| 7,034,786 | B2 | 4/2006 | Ham |
| 7,039,231 | B2 | 5/2006 | Brosamle |
| 7,064,770 | B2 | 6/2006 | Lachine et al. |
| 7,084,880 | B2 | 8/2006 | Kimura et al. |
| 7,084,881 | B1 | 8/2006 | Chen et al. |
| 7,088,478 | B2 | 8/2006 | Shirochi et al. |
| 7,126,616 | B2 | 10/2006 | Jasa et al. |
| 2002/0027603 | A1 * | 3/2002 | Kuwata et al. ................ 348/232 |
| 2003/0236675 | A1 * | 12/2003 | Duan ........................... 704/500 |
| 2004/0012603 | A1 | 1/2004 | Pfister et al. |
| 2004/0076336 | A1 * | 4/2004 | Bassi et al. .................... 382/274 |
| 2004/0113921 | A1 | 6/2004 | Hains et al. |
| 2004/0130669 | A1 | 7/2004 | Shin et al. |
| 2004/0156558 | A1 | 8/2004 | Kim |
| 2004/0218071 | A1 | 11/2004 | Chauville et al. |
| 2005/0024383 | A1 * | 2/2005 | D'Souza et al. ............ 345/601 |
| 2005/0206856 | A1 * | 9/2005 | Ishii ............................. 353/94 |
| 2006/0050074 | A1 * | 3/2006 | Bassi ........................... 345/427 |
| 2006/0098253 | A1 * | 5/2006 | Masuno et al. ................ 358/518 |
| 2006/0120620 | A1 | 6/2006 | Bassi et al. |
| 2006/0187233 | A1 * | 8/2006 | Diefenbaugh et al. ........ 345/591 |
| 2008/0062164 | A1 * | 3/2008 | Bassi et al. .................... 345/214 |

FOREIGN PATENT DOCUMENTS

| | | | |
|---|---|---|---|
| EP | 1534019 A2 | 5/2005 | |
| WO | WO 97/39420 | 10/1997 | |

OTHER PUBLICATIONS

Zwicker, M. et al., "EWA Splatting", IEEE Transactions on Visualization and Computer Graphics, vol. 8, No. 3, Jul. to Sep., 2002, pp. 223-238.

Chen, B. et al., "Footprint Area Sampled Texturing", IEEE Transactions on Visualization and Computer Graphics, vol. 10, No. 2, Mar. to Apr. 2004, pp. 230-240.

E. Catmull and A. R. Smith, "3-D Transformations of Images in Scanline Order", Computer Graphics, (SIGGRAPH '80 Proceedings), vol. 14, No. 3, pp. 279-285.

P.S. Heckbert, "Fundamentals of Texture Mapping and Image Warping" (Master's Thesis), Department of Electrical Engineering and Computer Science, University of California, Berkeley, CA, Jun. 17, 1989.

Silicon Video, svW1 Advanced Display Processor, Product Overview, Jul. 17, 2001.

Hoppe, et al., "Piecewise Smooth Surface Reconstruction", University of Washington, Seattle, WA, (SIGGRAPH '94 Proceedings) pp. 295-302.

Mortenson, Michael E., "Geometric Modeling", Wiley 1997.

M.J.D. Powell, "Radial basis function methods for interpolation to functions of many variables" Fifth Hellenic-European Conference on Computer Mathematics and its Applications (Athens, Sep. 2001).

Hebson, Robert and Lee, Louie, "Comanche Helmet Integrated Display Sighting System (HIDSS) Optical Distortion Correction Methodology".

International Search Report/Written Opinon for international application PCT/US04/29393, date of mailing Feb. 25, 2005.

* cited by examiner

Format Conversion

Figure 7

COLOR AND GEOMETRY DISTORTION CORRECTION SYSTEM AND METHOD

FIELD

The embodiments described herein relate generally to the electronic correction of images with distortion, and more particularly to the correction of color and geometry distortions of images.

BACKGROUND

Most image display devices exhibit some form of color distortions, which depending on the type of display device, could be accompanied by geometric distortions. These distortions are a result of non-ideal geometric behavior and non-ideal color response of the system components. Various causes such as imperfections of the optical components in the system, misalignment of the system components, material manufacturing faults, complicated surfaces in displays, and operational variations in the system can result in distortions. For instance lateral chromatic aberration in an RPTV (Rear Projection TV) or other projection systems is caused by dispersion of light optical lenses in these systems. An optical solution to correct for such a distortion, such as using extra-low dispersion glass, is costly and adds to the complexity of the system.

Visual manifestation of color distortions includes pixel-by-pixel variations, as well as non-uniformity of color, which includes brightness variation across a group of pixels. This causes a signal of fixed chrominance and luminance is seen to vary across the display or differ from its intended perception.

As for geometric distortions, warping algorithms and methods relevant to can be found in the U.S. Pat. Nos. 7,064,770 and 7,126,616, and the United States Patent Application Publication No. 2006/0120620A1, all assigned to Silicon Optix Inc. which are hereby incorporated by reference.

The present invention devises color and geometry distortion correction schemes that apply to a wide variety of displays, are flexible in terms of the types of distortions allowable, and are efficiently executable for real-time image processing.

SUMMARY

The embodiments described herein provide in one aspect, a method for correcting color distortions in an image, said method comprising:
  (a) obtaining input image data in a first format color space;
  (b) converting the input image data from the first format color space into a second format color space;
  (c) correcting color distortions in the converted image data for each color component independently in the second format color space and thereby generating color distortion corrected data;
such that a displayed image based on the color distortion corrected data is visually free of color distortions.

The embodiments described herein provide in another aspect a method for correcting color distortions in an image having color data points, said method comprising:
  (a) obtaining grid transformation data relating each distorted color data point to a corrected color data point, said grid transformation data spanning color space and image coordinate space,
  (b) representing the grid transformation data using surface functionals,
  (c) applying the surface functionals in an image for each color component independently to correct for color distortions in the image data.

The embodiments described herein provide in another aspect a method for correcting an image having color components in an image display system having geometric and color distortions, said method comprising:
  (a) obtaining image data for each of said color components;
  (b) correcting for geometric distortions in the image display system for each color component independently and thereby generating geometrically corrected image data,
  (c) correcting for color distortions in the geometric corrected image data for each color component separately to generate geometric distortion corrected and color distortion corrected image data,
such that a displayed image based on the geometric distortion corrected and color distortion corrected image data is visually geometric distortion free and color distortion free.

The embodiments described herein provide in another aspect an electronic system for correcting color distortions in an image, said system comprising:
  (a) an interface adapted to obtain image data in a first format color space;
  (b) conversion means adapted to convert the input image data from the first format color space into a second format color space;
  (c) color correction means adapted to correct color distortions in the image data for each color component independently in the second format color space and thereby generating color distortion corrected data;
such that a displayed image based on the color distortion corrected data is visually free of color distortions.

Further aspects and advantages of the embodiments described herein will be revealed in the following description along with the accompanying drawings.

BRIEF DESCRIPTION OF THE DRAWINGS

For a better understanding of the embodiments and/or related implementations described herein and to show more clearly how they may be carried into effect, reference will now be made, by way of example only, to the accompanying drawings which show at least one exemplary embodiment and/or related implementation in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein.

However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

The most fundamental color components introduced by the Commission Internationale de L'Eclairage (CIE) are the XYZ tri-stimulus values. They are measured in the linear light space by integrating Spectral Power Distribution (SPD) of a scene under three Color Matching Functions $X(\lambda), Y(\lambda), Z(\lambda)$ for the CIE Standard Observer. The RGB linear light components are derived from CIE XYZ by linear operations.

The video industry has a few format standards where the video applications or color processing are concerned. For example, Rec.601 for SDTV (Standard Definition TV) and Rec.709 for HDTV (High Definition TV) represent video signal as luma and chroma components, where the luma Y' is a weighted sum of all three primary components (red, green and blue) and two chromas $C_b'$, $C_r'$ are defined as differences between blue and red with the luma respectively. Conversion from R'G'B' to Y'$C_b'C_r'$ format may be represented by a matrix product as follows:

$$\begin{bmatrix} Y' \\ C_b' \\ C_r' \end{bmatrix} = \begin{bmatrix} k_{00} & k_{01} & k_{02} \\ k_{10} & k_{11} & k_{12} \\ k_{20} & k_{21} & k_{22} \end{bmatrix} \begin{bmatrix} R' \\ G' \\ B' \end{bmatrix} \quad (1)$$

Conversion from Y'$C_b'C_r'$, to R'G'B' format is obtained by inverting the matrix of equation (1). It is known that the color components in (1) are power function (or gamma) corrected:

$$R'=R^\gamma, G'=G^\gamma, B'=B^\gamma \quad (2)$$

This correction is conducted to achieve minimal noise visibility during video signal coding, and to make effective perceptual use of a limited number of bits per pixel since the lightness sensation of vision is roughly the 0.4 power function of luminance. For example, CRT displays have a non-linear intensity relationship to voltage. The intensity non-linearity is referred to as a gamma γ value, which is expressed as the power of a normalized voltage. This relationship, also known as the intensity transfer function, can be shown as:

$$I=V^\gamma \quad (3)$$

In color displays, each color component (e.g. red, green and blue primaries) has this non-linear intensity relationship. Specifically in CRT monitors, the gamma value for all three components is the same and usually has a value in a range from 2.35 to 2.55. Coincidentally, non-linearity of a CRT is almost equal to the inverse of the lightness sensitivity of human vision. This non-linearity is taken into account during video capturing so that video signals are gamma corrected at the capturing devices like cameras. This correction is done for the dual purpose of pre-compensating the nonlinearity of the display and coding into a perceptually uniform space.

Video signals coded with γ=1 are referred to as gamma de-compensated or as video signals that are coded in the linear light space; while video signals coded with γ>1 are referred to as gamma compensated or as video signals that are coded in the non-linear light space.

Some display devices, such as liquid crystal displays, have different relationships between voltage and intensity than CRT's and cannot be represented by a power function. Moreover, different color components may have different gamma values. For the sake of image compatibility, a display device whose intensity transfer function differs from that of a CRT display incorporates a correction that simulates the standard intensity transfer function of equation (3).

According to the Weber's law, well-known in the art, human vision cannot distinguish signals at two intensity levels, if the ratio between them is less than about 1%:

$$\frac{\Delta I}{I} < 0.01 \quad (4)$$

Therefore as the level of intensity in equation (4) drops, a grater number of bits are needed to represent a meaningful viewable signal. This fact is taken into account for gamma compensated signals in a non-linear space. In the linear space on the other hand, the data codes are spread uniformly throughout the signal's dynamic range and hence more bits are required in order to represent the same information. As an example, for a 10-bit signal in the non-linear space one would need at least 14 bits to process the signal in the linear space after conversion.

Representing a video signal in the non-linear light space does not result in any problems until the signal is spatially processed. Spatial filtering is a linear operation and consists of accumulation of video signal values multiplied by filter's coefficients over some pixel neighborhood. It is clear that the outcomes of filtering in the linear and non-linear light spaces are different. Moreover, since the human eye perceives a displayed image in the linear space, processing in the non-linear space is prone to known artifacts like moiré. In order to avoid these kind of artifacts, it is advantageous to perform spatial processing in the linear light space at the cost of handling more number of bits.

Figure 1:
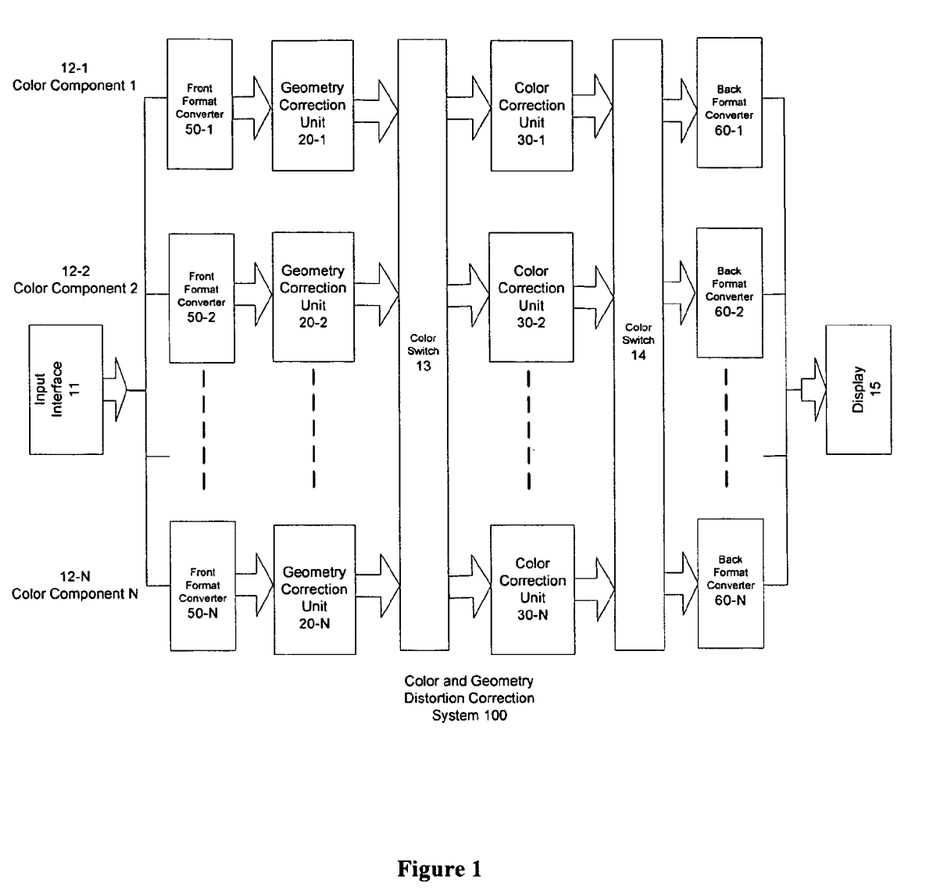
FIG. 1 is a block diagram of an exemplary embodiment of a color and geometry distortion correction system.

FIG. 1 is an illustration of an exemplary embodiment of a color and geometry distortion correction system 100. As shown, the incoming signal from an Input Interface 11 is split into N branches corresponding to N color components to be processed simultaneously for each color component in its separate channel. For example, in a video processing application, three channels represent three color components captured from a scene. These components could be red, green and blue colors in the RGB color space, or a combination of them in other color spaces.

In the example of FIG. 1, once the colors of an image are obtained, they are converted into other formats optimized for processing. Color components 12-1 to color component 12-N are the N color components. Format converters 50-1 to 50-N in each channel convert the format of the incoming signal from the input color space into a format in a different color space preferred for processing. In one particular example, the processing color space is chosen to be linear.

Referring now only to channel 12-1, the format converter 50-1 could be a Look-Up-Table (LUT) or a functional, depending on the size of the data and system requirements. A programmable LUT for instance, enhances the processing speed and can be programmed for various standards or custom gamma settings. A functional format converter may need at its input all color component values, in which case, the N branches are N duplicates of the original signal. However the output of each format converter is a single color that identifies that branch.

A geometry correction unit 20-1 compensates for geometric distortions and spatial variations across the display surface, prior to correcting for color distortions. Other channels 12-1 to 12-N have a similar structure to process the $2^{nd}$ through $N^{th}$ color components independently. As the geometric corrections can differ for the N color components, the system corrects for any color-dependent geometric distortion, such as lateral chromatic aberration.

In an exemplary embodiment, each geometry correction unit 20-1 to 20-N includes a function evaluator to evaluate warp maps, and a filtering block for interpolating the pixel values. The outputs of all geometry correction units are input to a color switch 13. Color switch 13 inputs one or more geometry correction outputs to every color correction unit 30-1 to 30-N. If necessary, all geometry correction units output can be input to every color correction unit, as is the case if the color correction for each color component depends on all other color component values. For each color correction unit 30-1 to 30-N, the inputs from one or more geometric correction units is selectively chosen by color switch 13.

Color correction units 30-1 to 30-N correct for a non-ideal color display. In particular, they correct for any color distortion that does not require a change in pixel positions, that is, any distortion of only color values. This includes color and brightness non-uniformity corrections. Those distortions that change pixel positions, which may be different for the different colors, are geometric in nature and are corrected using the geometry correction units 20-1 to 20-N. The color corrected signals, output from the color correction units 30-1 to 30-N, are then combined through a second color switch 14, and output to the back format converters 60-1 to 60-N which convert the data format according to the output requirements. All outputs from the color correction units 30-1 to 30-N may be required as input to each format converter, and this routing is handled by the second color switch 14. Color-independent geometric distortions, i.e. where the geometric correction is the same for all color components, can also be corrected using the same geometric warp transformation for all of the color components.

Finally, the corrected and format converted data are recombined and sent to a display unit 15.

In accordance with one exemplary embodiment every color correction unit 30-1 to 30-N further includes luminance and chrominance compensation blocks that adjust the color values by applying an offset and a gain function. This allows per-channel luminance and chrominance correction. The offset and gain values are also represented as warp maps in this example, namely, luminance and chrominance warps, allowing them to vary spatially and to provide local adjustments. The luminance and chrominance warp maps are generated based on the geometry warp maps in this example. The output of the luminance compensation can further be brought into range, if necessary, by using a soft-clipping function. This serves to smoothly clip values above a programmable threshold, hence avoiding contouring.

In one exemplary embodiment, the processing of data in the preferred linear color space is performed using floating point data representation in order to limit the number of data bits for efficient hardware implementation. Different floating point representations can be used in order to streamline the architecture for specific requirements such as minimizing bit widths for a given precision. In an exemplary embodiment, a 16-bit representation of data is provided which utilizes a default 3.9 floating point representation. An error of less than 0.25 percent has been achieved over the full 16-bit range.

Figure 2:
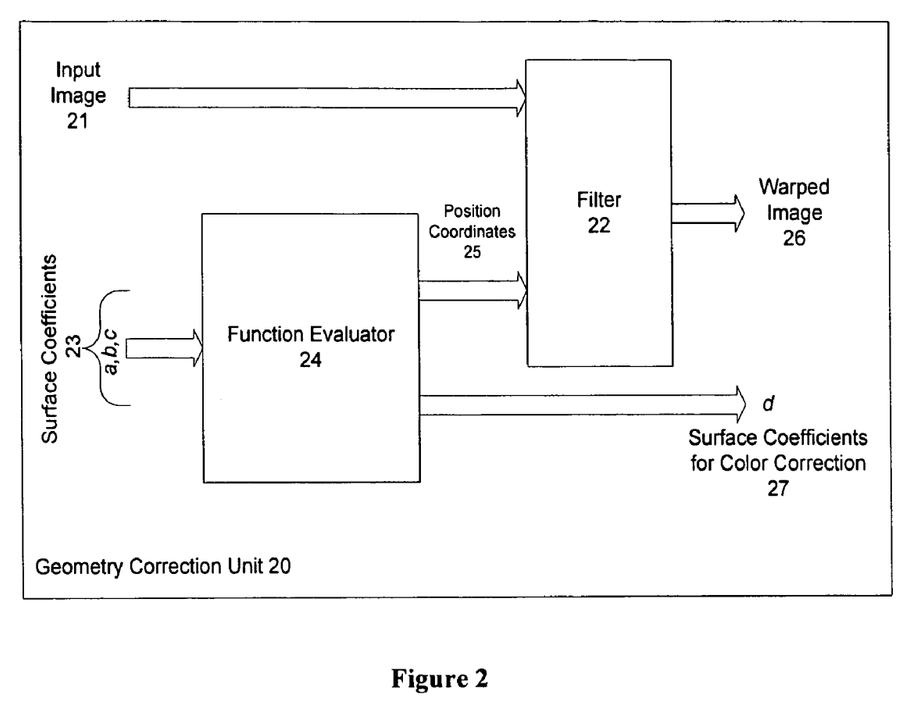
FIG. 2 is a block diagram of an exemplary embodiment of the geometry correction unit of FIG. 1.

FIG. 2 illustrates an exemplary embodiment of the geometry correction unit 20 which is generic for any of geometry correction units 20-1 to 20-N. There is one fully independent geometry correction unit for each color component as discussed above. The geometry correction unit 20 obtains the format converted input image data 21, corrects for geometric distortions, and generates data sets 26 and 27 needed by color correction unit 30 which is generic for any of color correction units 30-1 to 30-N.

Geometry correction unit 20 warps the input image data 21 for the associated color component and produces pre-compensated image data 26, such that, when the image is displayed, it is visually free of geometric distortions. The geometric distortions include optical distortions such as lateral chromatic aberrations which is a result of the wavelength dependent dispersion. They could also include color displacement which is a result of different images corresponding to each color component originating from different sources, e.g., different LCD micro-display panels used in front or rear projection systems. The transformation performed by geometry correction unit 20 has the inverse effect and pre-compensates for the geometric distortions of the display system. Since each color component is independently warped, any color dependent geometric distortions, such as lateral chromatic aberrations or color displacement, are automatically corrected.

The geometric transformation or the warp for each color component is a mapping between input pixel coordinates $(u_i, v_i)$ and output pixel coordinates $(x_i, y_i)$:

$$(u_i, v_i) \Leftrightarrow (x_i, y_i) \tag{5}$$

This transformed data can be represented by various means, with the most accurate case being grid transformation data or LUT, storing the mapping for each pixel. Usually, however, LUT's are used to store only these data for a subset of pixels, which results in a loss of accuracy. In one exemplary embodiment, surface functions are used to represent the grid transformation data mapping, which has the benefits of being both accurate and efficient for hardware implementation. From the geometry correction perspective, a surface function is an equation that is evaluated in hardware to reproduce equation (5). For the particular case of a bi-cubic polynomial surface as an example, these equations take the form:

$$u_k(x, y) = \sum_{i,j=0...3} a_{k,ij} x^i y^j, \text{ for color } k = 1 \ldots N \tag{6}$$

$$v_k(x, y) = \sum_{i,j=0...3} b_{k,ij} x^i y^j, \text{ for color } k = 1 \ldots N \tag{7}$$

The surface function representation and the above equations are discussed in detail below.

Equations (6) and (7) represent an inverse map, mapping the output image coordinates (generated by geometry correction unit 20) to the input image coordinates. Geometry correction unit 20 uses inverse map architecture. For each output pixel position coordinate $(x_i, y_i)$, an input pixel position coordinate $(u_i, v_i)$ is generated by evaluating equations (6) and (7). This evaluation, in one exemplary embodiment, can be efficiently implemented in hardware using optimized multiply and accumulate (MAC) units. In FIG. 2, the MAC units are collectively referred to as function evaluator 24. The surface coefficients 23 are pre-computed and stored and then are accessed by function evaluator 24.

In cases where the transformation is represented in a functional form, additional information about the transformation can be extracted. In particular, derivative information (local Jacobian and gradient), and any variations thereof, can be directly obtained from these equations. With a grid transformation data approach, accurate derivative information is not available.

After obtaining the input position coordinate 25 ($u_i, v_i$) in the input space and any derivative information, filter 22 generates pixel values for each color component. The primary circuit for image filtering and processing is also a MAC function in this example. The equation for filtering is the following:

$$O = \frac{\sum_{i=0}^{K} I_i k_i}{\sum_{i=0}^{K} k_i} \quad (8)$$

According to this equation, filter 22 performs a weighted sum over a number of input pixels, K, with color values $I_i$, chosen within a neighborhood of the position ($u_i, v_i$) computed by function evaluator 24. The $k_i$ are the weights, or filter coefficients. The denominator serves to normalize the result. The derivative information can be used to modify the filter coefficients to obtain a specific filter response. A base set of filter coefficients can be pre-computed and stored, which can then be modified in real time using the derivative information. The details of the filter, such as number of pixels and their arrangement in the weighting, can be designed to meet specific image quality criteria. An efficient filter architecture producing high image quality that can be used is detailed in the U.S. Pat. No. 7,064,770, assigned to Silicon Optix Inc.

Geometry correction unit 20 generates warped data 26 which may be needed by the corresponding color correction unit 30. Whether or not geometry correction is needed before color correction depends entirely on the type of the display system. For instance, in a flat panel plasma or LCD display system, geometric warping is not applicable since the image is not projected. The only type of geometry correction that may be required is for sub-pixel corrections. However, in a rear or front projection display system, geometric warping is necessary and should be done prior to color correction. In the following the color correction is described and applicable in all types of display devices as appreciated by one skilled in the art.

In one exemplary embodiment color correction unit 30 evaluates surface functions, in a color space. The coefficients of the color surface can vary in pixel coordinate space. This allows correction of color distortions locally and independently as accurately as possible at every pixel. Therefore the color surface coefficients are also represented as surfaces over coordinate space:

$$d_{k,s}(x, y) = \sum_{i,j=0...3} c_{k,sij} x^i y^j, \quad (9)$$

for color $k$ and color coefficient $s$

In one example, when geometry correction is used, the function evaluator 24 computes for each output pixel coordinates ($x_i, y_i$), all surface coefficients $d_{k,s}$ 27 for color k needed by the color correction unit. In one exemplary embodiment, the surface coefficients $\{c_{k,sij}\}$ are pre-computed and stored and input to the MAC units. Geometry correction unit 24 can be viewed as evaluating all surfaces that are defined over the output positional coordinates. The surface functions for color correction are discussed below. In another example, when there is no geometry correction, such as for flat panel displays (e.g. LCD, Plasma) the evaluation of equation (9) can be done by the color correction unit discussed below.

Figure 3:
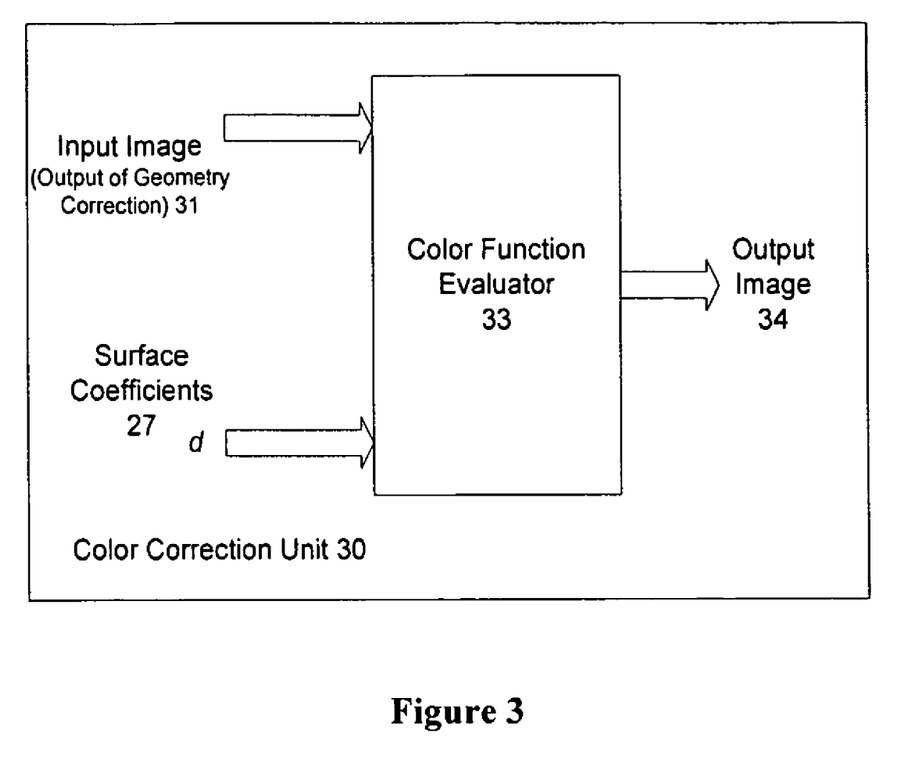
FIG. 3 is a block diagram of an exemplary embodiment of the color correction unit of FIG. 1.

The (non-geometric) color correction is implemented in color correction unit 30 illustrated in FIG. 3 which is generic for any of color correction units 30-1 to 30-N. Each color component has an independent color correction unit to correct for spatial variations in color, including distortions such as luminance and chrominance non-uniformity.

Color correction unit 30 transforms the image data in color space. Pixel coordinates are not altered, only their color values are transformed. The transformation for a specific color component may depend on the color values of other color components. This implies that, at the input of color correction unit 30 for every channel 12-1 to 12-N, the image data containing all color components must be available.

Referring back to FIG. 1, the programmable color switch 13, feeds all color components, or more accurately, all color component image data, to each color correction unit 30-1 to 30-N. In the situation where color correction can be performed for each color component, independent of other color values, only one set of image data is used. This will be referred to as separable color correction in which case color switch 13 would be in a by-pass mode. The programmability of the color switch ensures the ability to feed data for one or more color components to color correction unit 30. In one example, each color correction unit 30-1 to 30-N includes a color function evaluator 33 to evaluate warp maps in color space. Input data 31 is transformed to an output image 34 in a manner such that when the final image including all color components is displayed, it is visually free of any color distortions. The transformation performed by color correction unit 30 is the inverse of, and pre-compensates for that undergone in the display system.

It should be noted that the color corrections performed according to the exemplary embodiments discussed here are not limited to those caused by the display system. Using the same method, color distortions caused by other sources are also corrected. For instance, all color distortions caused by an image acquisition device like a camera or a camcorder, which are in practice combined with those caused by the display system are automatically corrected. Similarly, in a broadcasting system, color distortions caused by the compression, coding, transmission, decoding, and decompression, are also combined with those caused by the image acquisition device and the display system. In this way, the combined color distortions are collectively corrected.

The color transformation for each color k is a mapping between input pixel color values $C_{i,k}$ and output pixel color values $C'_{i,k}$, where the index identifies the pixel:

$$C_{i,k} \Leftrightarrow C'_{i,k} \quad (10)$$

Analogous to a geometric transformation, the color transformation can be represented by various means, with the most accurate case being a LUT or grid transformation data storing the mapping for each pixel position and color component. Usually, however, grid transformation data are used to store only these data for a subset of pixels, which results in a loss of accuracy. In one exemplary embodiment, surface functions are used to represent equation (10), which has the benefits of being both accurate and hardware implementation efficient. These surfaces are simply equations that are evaluated in hardware to reproduce equation (10). For the particular case of an N-cubic polynomial surface, these equations take the form:

$$C'_k(\vec{C}) = \sum_s d_{k,s} C_1^{i_1} C_2^{i_2} \ldots C_N^{i_N}, \text{ for color } k = 1 \ldots N \quad (11)$$

$$s = (i_1, i_2, \ldots, i_N), i_k = 0 \ldots 3$$

As discussed above, in general, color corrections for color component k will depend on all N color components. The surface coefficients $d_{k,s}$ vary in coordinate space. If the color correction is separable, then the surface equation simplifies to:

$$C'_k(C_k) = \sum_{s=0\ldots3} d_{k,s} C_k^s, \text{ for color } k = 1 \ldots N \quad (12)$$

A more detailed discussion of surface function representation of color corrections is given below. Equation (12) can be efficiently implemented in hardware using optimized MAC units. Since the color transformation does not alter pixel coordinates, no filtering operation is needed.

In projection systems, performing color corrections after the geometric corrections, also allows correction of any color variations due to the geometric correction process itself. The geometric correction scales the input image non-linearly, which results in variation of effective pixel resolution across the image. The projection of the image causes variation in light intensity across the image when it goes through an optical assembly. In addition, non ideal filtering can also lead to color variations. The color correction will take into account any of these variations introduced by the geometric correction process.

The color transformation equation (10) is generated by first displaying a set of color patterns, then using a measuring device such as a spectrophotometer to measure the systems response, and finally inverting this response to obtain the correction. In one exemplary embodiment, all measurements are done in linear space and thus the correction is applied in linear space for optimal results. By having two format converters, namely, front format converter 50 and back format converter 60, conversion between non-linear (gamma compensated) signals and linear signals is made possible, prior and after any correction. This permits color corrections to be made in linear space to achieve high image quality in display systems such as flat panel LCD and plasma as well as CRT and projection displays.

The geometric and color correction can be generally described as a mathematical coordinate transformation between the input image spatial coordinates and color values and the output image spatial coordinates and color values:

$$(u_i, v_i, \vec{C}_i) \Leftrightarrow (x_i, y_i, \vec{C}'_i) \quad (13)$$

Here i ranges over the input pixels, $(u_i, v_i)$ gives the input pixel's spatial coordinates, the vector $\vec{C}_i$ gives the input pixel's color values in a color space, $(x_i, y_i)$ gives the output pixel's spatial coordinates as mapped to the output space, and the vector $\vec{C}'_i$ gives the corresponding pixel's output values. For the common RGB color space for instance, $\vec{C}$ is an RGB value. For a given input pixel i, at some position $(u_i, v_i)$, normally integer, all possible color values need to be described.

Hence for an image of size W pixels horizontally, and H pixels vertically, with N colors and Q bits per color component, the full transformation of equation (13) consists of $W \times H \times 2^{NQ}$ grid points. This means that for every coordinate $(u_i, v_i)$, $W \times H$ in total, there are $2^{NQ}$ color values described by $\vec{C}_i$ in equation (13). However, in practice a much smaller subset is available.

The data described in equation (13) is generated by first displaying specific test patterns, and measuring their geometric and intensity behavior for all colors using a plural of capture devices, such as cameras and spectrophotometers. The measured data gives the non-ideal behavior of the device. Inverting this measured data, gives the required correction, namely (13), that will effectively cancel the non-ideal behavior, in turn presenting a distortion free image.

Equation (13) is a representation of the correction, in the form of a grid transformation data. Using a grid transformation data format directly in hardware entails storing the grid data set, or some subset of it, in a look-up table (LUT). Each coordinate and color component requires a separate LUT, which is addressed by one or more grid point. A LUT for all input pixels is not feasible for hardware implementation due to the large memory requirements. Many prior art systems store coordinates for a subset of the input pixels, which requires some form of interpolation in the hardware to generate the grid points for the remaining pixels. Linear interpolation is usually used and the grid subset chosen is fixed. Linear interpolation of a fixed grid subset is prone to errors in the approximation of the original correction given by equation (13). In addition, flexibility in enhancing the corrections is lost due to the fixed subset.

Figure 4:
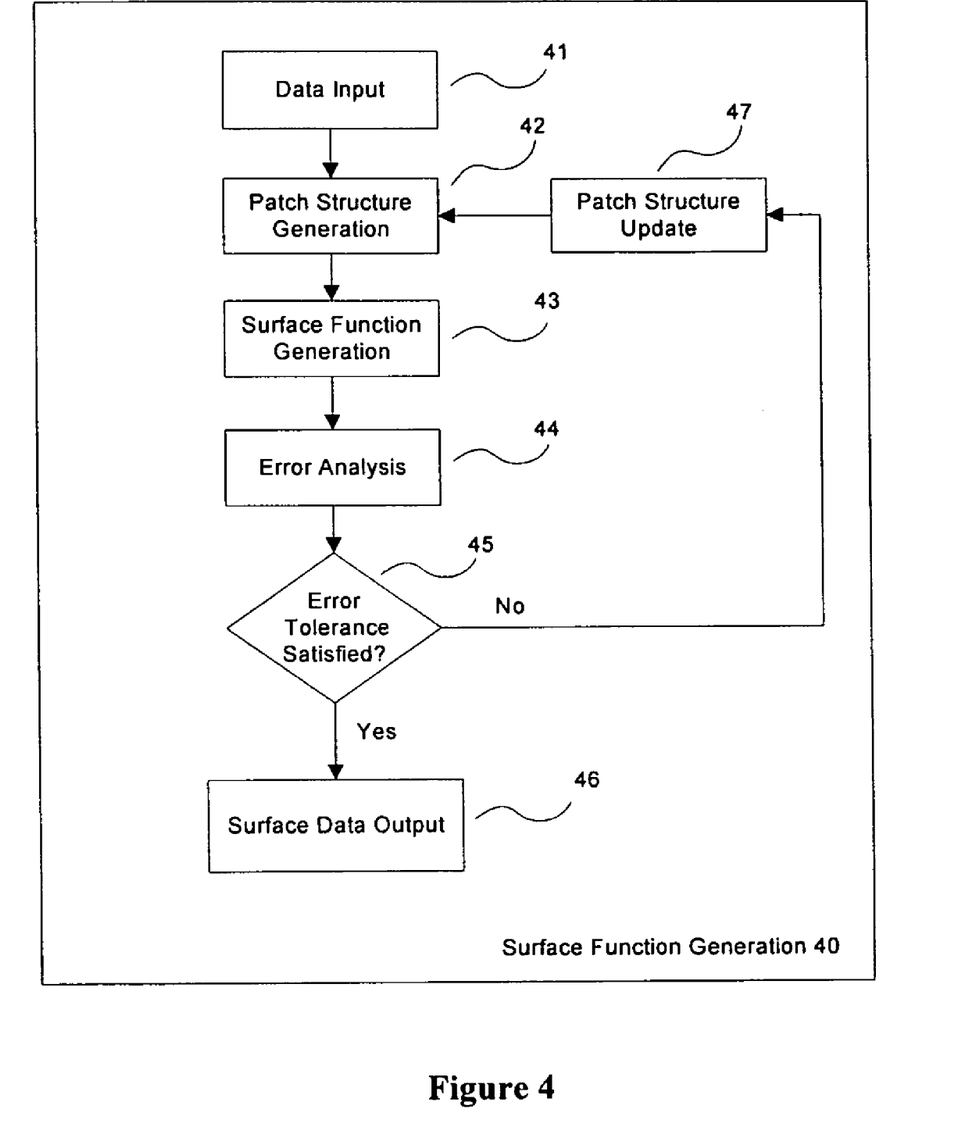
FIG. 4 is a block diagram of an exemplary method for generating data used by the geometry correction unit and the color correction unit of FIG. 1.

FIG. 4 illustrates the method of surface function generation 40 for surface functional representation of distortion correction according to one exemplary embodiment. This implementation is both hardware efficient and accurate, and maintains flexibility for image enhancements.

At step data input 41, grid transformation data are obtained as defined by equation (13). At step patch structure generation 42, the underlying structure is divided into patches based on the complexity of the corresponding transformation in different regions of the display. At step surface function generation 43, a surface functional is generated corresponding to the transformation of the grid transformation data in the corresponding patch.

At step error analysis 44, a test subset of color values derived from the surface functional are compared with the corresponding exact color values derived from the grid transformation data. At step error tolerance satisfied 46, the differences between these two subsets of color values are examined against a pre-set tolerance levels. If the differences are greater than a preset tolerance level, at step patch structure update 47, the patch structure is further refined to obtain more accurate color values from the surface functionals.

This process continues until the error analysis test criteria are met, at which point, step surface data output 46, is performed and the surface functional generation is complete. This process is performed for every patch.

In general, each output coordinate can be mathematically described as a function of the input coordinates and color values. Describing output spatial coordinates in terms of input spatial coordinates is referred to as a forward map. Alternatively, each input spatial coordinate can be described in terms of output spatial coordinates, which is referred to as an inverse map. The benefits of using inverse maps for describing geometry transformations are well-known, namely the image in hardware can be constructed in scanline order on the output and holes in the output image can be avoided. The description below is based on an inverse map; however, it is also applicable for a forward map based implementation. In the inverse map formalism the coordinate functions for the geometry correction can be written as:

$$u = F_u(x, y, \vec{C}')$$

$$v = F_v(x, y, \vec{C}') \quad (14)$$

For all practical geometric distortions, such as lens distortion, or lateral chromatic aberrations, the geometry transformation is independent of the color values, however it may be specific to the color component, that is, it may differ for the different color components. This means that the coordinate transformations take the form:

$$u = F_{u,k}(x, y)$$

$$v = F_{v,k}(x, y)$$

$$k = 1, \ldots N \quad (15)$$

Here k ranges over the N colors, thus there are 2N coordinate transformation functions. These functions are also referred to as geometry functions.

Analogously, the color values can also be mathematically described by functions of the input coordinates and color values. The functions, shown below, are referred to as the color correction functions, or simply color functions:

$$\vec{C}' = \vec{F}_c(x, y, \vec{C}) \quad (16)$$

The above equation is in vector form where each color value is described by a vector $\vec{C} = (C_1, \ldots, C_N)$, which for example corresponds to (R,G,B) in the RGB color space. In color component form, for each color component k, the function can be written as:

$$C'_k = F_{c,k}(x, y, \vec{C}) \quad (17)$$

The color correction function will in general depend on the spatial coordinates. When both geometry and color correction is applied, the color correction follows the geometry correction (FIG. 1) and the domain coordinates $(x, y, \vec{C})$ for the color function are defined in the output of the geometry correction, hence the notation (x,y) is used in (17) rather than (u,v). Similarly, the color value C used is that at the output of the geometry correction, which for a good filter is very close to that at (u,v) in the input image, hence the input notation is used. When no geometric correction is performed, the two spatial coordinates are the same: (x,y)=(u,v). This is often the case for non-projection systems, such as LCD and Plasma displays, where only color correction is used. When no color correction is used, the two color values are the same: $\vec{C} = \vec{C}'$.

The correction functions are summarized below:

$$u = F_{u,k}(x, y), v = F_{v,k}(x, y), C'_k = F_{c,k}(x, y, \vec{C}), k = 1 \ldots N \quad (18)$$

One exemplary embodiment represents each of the correction functions as a surface functional. Surface functionals for two-dimensional and multi-dimensional transformations have been presented in the U.S. patent application Nos. 2006/0050074 and 2006/0120620A1, both assigned to Silicon Optix Inc., where the focus has been on describing color independent geometric distortions, i.e. the correction is the same for all color components in a color space, and the same grid data set and surface functionals describe the correction for all components. For lateral chromatic aberrations however, the grid data set and surface functionals differ for each color component. As discussed before, any color independent geometric distortion common to all colors can be included in the general case of color dependent geometric transformation.

The above discussion, in particular equation (18), does not specify the explicit form of the functions; it merely states that the coordinate transformation can be represented as functions, which should evaluate to reproduce the coordinate values of equation (13). Evaluating equation (18) requires building explicit forms for the functions; that should reproduce equation (13). This is a well known problem in the field of numerical optimization, namely constructing functions that accurately approximate, within some tolerance, a given dataset. Any number of methods can be used for the construction; however, they must be tailored to hardware implementation.

A very general approach is to fit the grid of equation (13) to a set of basis functions that can be evaluated in hardware. In FIG. 4, the step of surface function generation 43 performs the fitting operation. A linear fit is best suited for hardware implementation. Representing the basis functions as $\{B_r, D_s\}$, a linear fit to the above functions takes the form:

$$u = F_{u,k}(x, y) = \sum_{r=1\ldots R} a_{k,r} B_r(x, y) \quad (19)$$

$$v = F_{v,k}(x, y) = \sum_{r=1\ldots R} b_{k,r} B_r(x, y)$$

$$C'_k = F_{c,k}(x, y, \vec{C}) = \sum_{s=1\ldots S} e_{k,s} D_s(x, y, \vec{C})$$

$$k = 1 \ldots N$$

Here R and S gives the number, or dimensions, of the basis functions. Even though the combination of the basis functions is linear, the basis functions themselves need not be linear. The linear coefficients $\{a_{k,r}, b_{k,r}, e_{k,s}\}$ can be computed using well-known fitting methods such as linear least squares. The fit can also be made into an interpolating function, matching exactly the grid points.

In general, the basis functions and their dimensions are chosen according to grid data set and hardware complexity. For all display correction grids, without loss of generality, additional optimizations can be made. The color correction basis function $D_s$ can be further separated into a spatial function that uses $B_r$, and a set of basis functions $B_{c,s}$ define in the color domain. This allows the color function to be written as:

$$C'_k = F_{c,k}(x, y, \vec{C}) \quad (20)$$

$$= \sum_{s=1\ldots S} \left( \sum_{r=1\ldots R} c_{k,rs} B_r(x, y) \right) B_{c,s}(\vec{C})$$

The quantity in brackets is essentially identical to the geometry functions and can be evaluated using the same hardware. It can be considered as a linear fit to the coefficient of $B_{c,s}$ over the spatial space. In particular, the color function can be replaced the following two equations:

$$d_{k,s} = \sum_{r=1...R} c_{k,rs} B_r(x, y) \quad (21)$$

$$C'_k = \sum_{r=1...S} d_{k,s} B_{c,s}(\vec{C})$$

Combining these with the fitted functions for u and v, gives three functions defined on the spatial coordinates and one function defined on the color values, for each color component. Since the basis functions are well defined for all real values, the above functions can be evaluated at all real values. The domain coordinates rather than being at discrete integer positions are defined for all real values, and can be views as mathematical spaces. The spatial coordinates lie in the spatial space and the color values lie in the color space. Furthermore, by being able to evaluate these functions over their corresponding spaces gives, in the mathematical sense, 2-dimensional and N-dimensional surfaces in explicit functional form. By approximating the grid as real functions over real space, the coordinate transformation is now represented by surface functions. The linear fit coefficients are the surface coefficients that along with the basis functions fully define the surface.

The surface functional also has the benefits of scalability and providing additional mathematical information, such as various order derivative information. Scalability allows easily adjusting the surface equation for a change in image resolution—which simply becomes a scaling of the coefficients. The surface can also be adjusted for common distortions encountered in optical systems, such as rotations, linear shifts and keystones. All these operations for a LUT require re-generation of the LUT. Unlike a LUT defined at a subset of integer pixels position, the surface is defined in all domain directions and is truly 2-dimensional or N-dimensional.

For hardware implementation a polynomial basis is the most efficient, as it can be implemented using hardware optimized MAC (multiply-accumulate) units. This basis is also sufficient to represent complex grids. In a polynomial basis, the basis functions take the form:

$$B_{\vec{r}}(u, v) = u^i v^j, \vec{r} = (i, j), i = 1, ..., M_u, j = 1, ..., M_v \quad (22)$$

$$B_{c,\vec{s}}(\vec{C}) = C_1^{j_1} C_2^{j_2} \cdots C_N^{j_N}, \vec{s} = (i_1, i_2, ..., i_N),$$

$$i_k = 1, ..., M_k, k = 1, ..., N$$

Here the basis function indices have been assigned vector indices to simplify notation. The quantities $\{M_u, M_v, M_k\}$ give the dimensions of the basis functions in the corresponding coordinate space.

The above basis functions are defined over the entire domain space. With a large domain, it is often necessary to use a large number of basis functions to obtain an accurate representation of the transformation. In particular, this means using high order polynomials, which is sensitive to noise in the data and requires a large number of MAC units. These issues can be resolved by keeping the basis dimensions small and instead introduce a subdivision of the domain space into rectangular patches. Each patch has its own sub-surface, described by surface coefficients. The complete surface is a union of the sub-surfaces, which are built to match at the patch boundaries.

At step patch structure generation 42 division into patches is performed. If a single patch spanning the entire domain is sufficient, then step 42 can be eliminated. The same numerical techniques can be used to solve for the surface coefficients. In particular, the coefficients can be obtained by solving a constrained least squares fitting problem, with the constraints formulating the boundary conditions at the patch boundaries. Step surface function generation 43 is appropriately optimized to perform constrained least squares fitting. The patches are defined below and are 2-dimensional in (x,y) space and N-dimensional in $\vec{C}$ space.

$$P_{k,l} = \{(x, y) \mid x_{k,1l} \le x \le x_{k,2l}, y_{k,1l} \le y \le y_{k,2l}\}, l = 1 ... L_k \quad (23)$$

$$P_{c,k,t} = \{(C_1, ..., C_N) \mid C_{k,1t,1} \le C_1 \le C_{k,2t,1},$$

$$..., C_{k,1t,N} \le C_N \le C_{k,2t,N}\},$$

$$t = 1 ... L_{c,k} \quad k = 1 ... N$$

Depending on which patch the domain coordinate is, the corresponding surface is evaluated. Combined with the patch subdivision, the data defining all surface functions is summarized below (here the F notation of equations (19) and (20) is dropped for simplicity and explicit k indices used for u and v to make it clear that define different surfaces for different color components):

$$u_k(x, y) = \sum_r a_{k,r}^l B_r(x, y), \text{ for primary } k \text{ and } (x, y) \in P_{k,l} \quad (24)$$

$$v_k(x, y) = \sum_r b_{k,r}^l B_r(x, y), \text{ for primary } k \text{ and } (x, y) \in P_{k,l} \quad (25)$$

$$d_{k,s}^t(x, y) = \sum_r c_{k,sr}^{t,l} B_r(x, y), \text{ for primary } k, (x, y) \in P_{k,l} \text{ and} \quad (26)$$

$$\vec{C} \in P_{c,k,t}$$

$$C'_k(\vec{C}) = \sum_s d_{k,s}^t B_{c,s}(\vec{C}), \text{ for primary } k \text{ and } \vec{C} \in P_{c,k,t} \quad (27)$$

This gives the complete data set that defines the geometry correction and color correction. Instead of storing the coordinates in a LUT, now the surface coefficients and patch boundary information is stored. The basis functions are implemented in hardware and hence do not have any storage associated with them. The data that needs to be stored is summarized below—a polynomial representation is assumed.

$$\{a_{k,r}^l, b_{k,r}^l, c_{k,sr}^{t,l}\} \quad (28)$$

$$\{x_{k,1l}, x_{k,2l}, y_{k,1l}, y_{k,2l}\}$$

$$\{C_{k,1t,1}, C_{k,2t,1}, ..., C_{k,1t,N}, C_{k,2t,N}\}$$

$$r = (i, j), i = 1, ..., M_u, j = 1, ..., M_v, l = 1, ..., L_k,$$

$$t = 1, ..., L_{c,k} \quad s = (i_1, i_2, ..., i_N), i_k = 1, ..., M_k,$$

$$k = 1, ..., N$$

Figure 5:
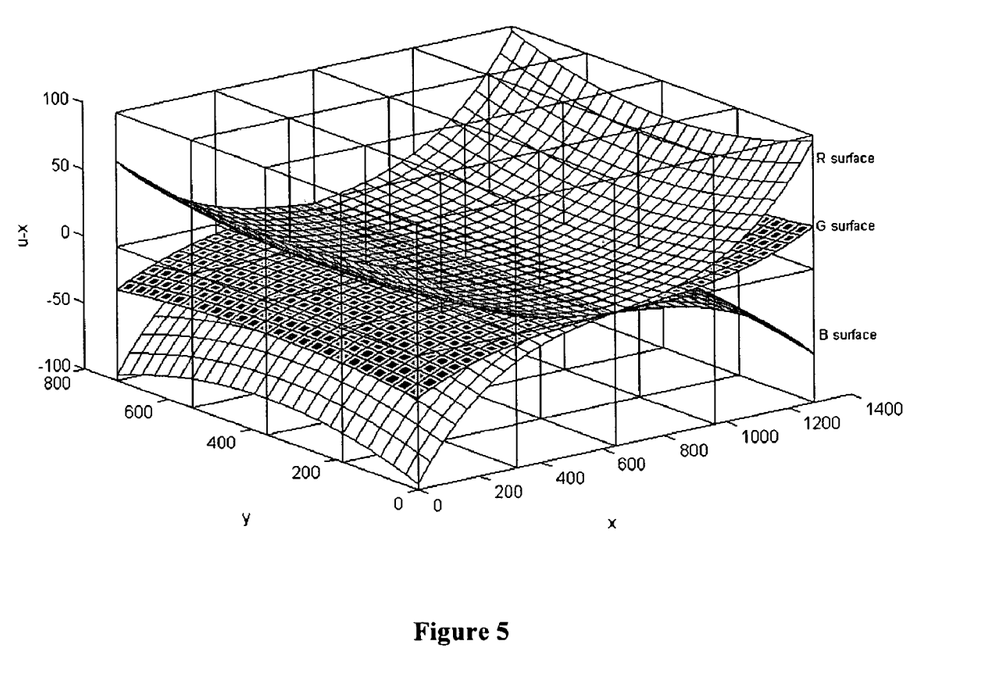
FIG. 5 is a graphical diagram illustrating three exemplary surface functions that together define a first coordinate, in an RGB based system.
Figure 6:
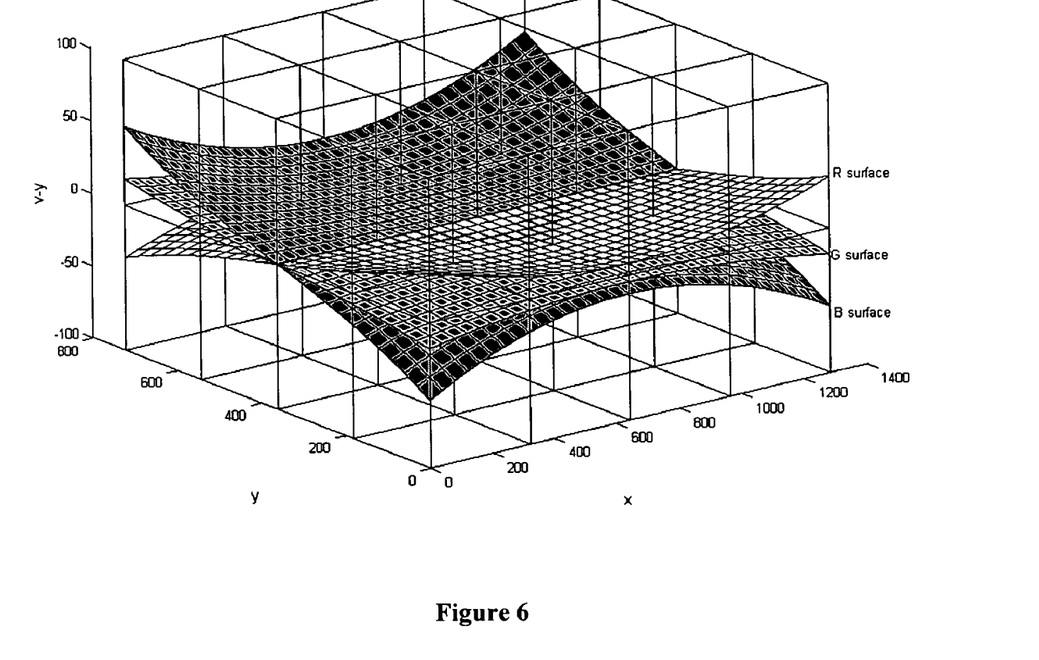
FIG. 6 is a graphical diagram illustrating three exemplary surface functions that together define a second coordinate, in an RGB based system.

Examples of 2D surfaces for the (u,v) coordinates in an RGB system are shown in FIGS. 5 and 6. To make the three surfaces more clear in these figures, (u–x,v–y) are shown instead of (u,v). These surfaces correspond to a lateral chromatic aberration where the three channels, RGB, undergo different amounts of pin-barrel type distortion due to the optics. A 4×4 patch structure is also shown. This patch structure lies in (x,y) space only, and is extended vertically to show how it divides the surface into sub-surfaces defined on each patch.

The above data given in equation (28) is written in its most general form and appears complex. However for practical display distortions, the full complexity is not needed. The main criteria for balancing complexity are accuracy and hardware efficiency. The above representation has many adjustable parameters allowing one to obtain a format that is efficient and accurate. As mentioned above, a polynomial representation can be used. A bi-cubic polynomial per patch is sufficient to represent complex 2-dimensional surfaces, which maintains the number of MAC units to a reasonable level. Having established the polynomial order, the number of patches can be adjusted to match a specific tolerance level. The error for geometry correction is given by measuring the vector distance between the original coordinates and those obtained from the surface, which should be less than the tolerance level:

$$\text{Error}=\|(u_i,v_i)-(v_k(x_i,y_i),v_k(x_i,y_i))\|\leq \text{Tolerance} \forall i \quad (29)$$

Step error analysis 44 in FIG. 4, computes the error. Starting from a default patch arrangement, that is a specific number or patches with specific boundaries, the patch division can be continuously subdivided until the tolerance level is met. Similarly for the color correction:

$$\text{Error}=\|\vec{C}'_i-\vec{F}_c(x_i,y_i,\vec{C}_i)\|\leq \text{Tolerance} \forall i \quad (30)$$

Here we can also subdivide the patches in both spatial and color space. The subdivision is performed by step patch structure update 47, and continues until error tolerance levels are met in step error tolerance satisfied 45.

Simplifications can also be made if the color components can be independently corrected. In this case, the color basis functions depend on a single color component, and s becomes a scalar index. Furthermore a single cubic polynomial in color space is sufficient for the smooth variations in color at a given position. With these simplifications, the surfaces take the less complex form of:

$$u_k(x,y) = \sum_{i,j=0...3} a^l_{k,ij} x^i y^j, \text{ for primary } k \text{ and } (x,y) \in P_{k,l} \quad (31)$$

$$v_k(x,y) = \sum_{i,j=0...3} b^l_{k,ij} x^i y^j, \text{ for primary } k \text{ and } (x,y) \in P_{k,l} \quad (32)$$

$$d_{k,s}(x,y) = \sum_{i,j=0...3} c^l_{k,sij} x^i y^j, \text{ for primary } k, (x,y) \in P_{k,l} \quad (33)$$

$$C'_k(C_k) = \sum_{s=0...3} d_{k,s} C^s_k, \text{ for primary } k \quad (34)$$

For optical systems, the variation in the geometric correction is normally smooth and color correction at any given position normally varies gradually in color space. For such systems, equations (31) to (34) accurately represent the corrections.

Figure 7:
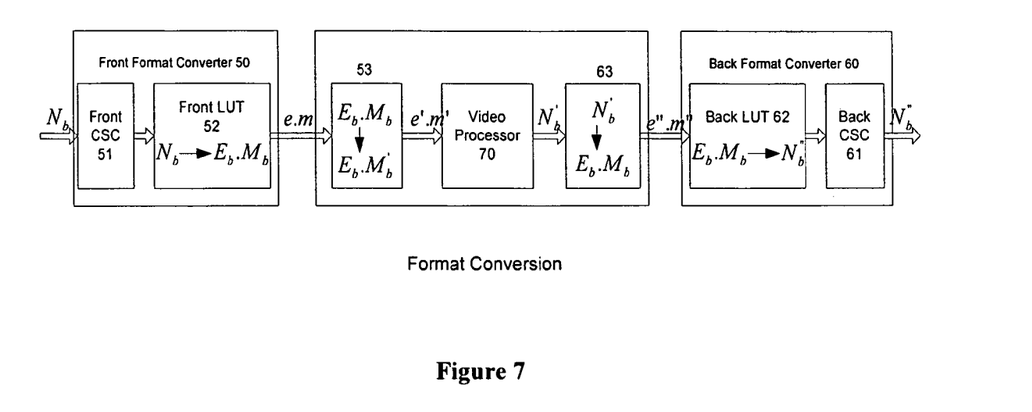
FIG. 7 is a block diagram of exemplary format conversion blocks and their relation to the video processing blocks.

FIG. 7 illustrates one exemplary embodiment where format conversion in the video processing pipeline is performed in two stages. The first stage is performed by front format converter 50 and the second stage by back format converter 60. The input signal is converted into a format in a color space preferred for video processing, for instance by applying inverse intensity transfer function of the device used to produce the video in case the input space is non-linear and the processing space is linear. Video processor 70 consists of the geometric and color corrections units plus the color switching, discussed above. After the signal is processed by video processor 70, it is then converted into a format in a color space acceptable by displaying device, e.g. by applying inverse intensity transfer function of the display if the processing space is linear and the output light is non-linear.

Color space and format conversions in these two occurrences are independent and do not require to be the same. For example, an input video signal may be coming in one of the standard color spaces with Y'$C_b$'$C_r$' components, while the output video signal is sent to display devices such as CRT, LCD, etc. that normally operate in the R'G'B' color space. There are multi-component color displays with more than three channels such as a four-channel DLP engine: red, green, blue and white. Some new devices may have up to six color components: red, green, blue, cyan, magenta and yellow. In the case of multi-component display, a video signal should be converted to multi-component color space.

In color science there are perceptually uniform color spaces. In these spaces a small perturbation to a color value is approximately equally perceptible across the range of that value. The most popular among them are CIE L*a*b* and CIE L*u*v* color spaces.

Depending on the video processing application, an electronic system should convert input video signals into one of the color spaces that is most optimal for the application. Intensity transfer functions from the two occurrences may be not the same either. For example, input video may be coded in accordance with Rec.601 standard, but then should be displayed on RGB display or even on displays with custom gamma values. Moreover, gamma of intensity transfer function may be not the same for all color components, or these functions do not follow the power law.

In order to make efficient use of the hardware in an electronic system, it is preferred to represent video signals in a so-called "floating point" (FP) format, where the whole dynamic range of the signals is divided onto non-equal regions such that each region is uniformly sampled by the same number of digital codes. From Weber's law, equation (4), it can be seen that dark regions should have the codes more densely spread than the codes in bright regions, e.g. signal's difference presented by two neighboring codes may be greater for signals with larger intensity values.

The FP Format is sufficient to accurately represent data in the linear light space with $N_b$=16 bits corresponding to 12 bits in a non-linear light space.

Let $E_b$ be the number of bits for the exponent and $M_b$ be the number of bits for the mantissa. Signal with a value in a range I=[0,$2^{N_b}$) may be represented in the following format:

$$I = \begin{cases} 2^{M_b-1+e}\left(1+\frac{m}{2^{M_b}}\right), & e > 0 \\ m, & e = 0 \end{cases} \quad (35)$$

where e=[0,$2^{E_b}$−1] and m=[0,$2^{M_b}$−1]. Since every code corresponds to a unique integer value, this representation is non-redundant.

As an illustration of a case with $N_b$=16, $M_b$=9 and $E_b$=3, characteristics of floating point format are shown in Table 1. Maximum error for chosen number of bits for mantissa and exponent is around 1/1024~0.001, which is more than enough for perceptional quality. Note that 3.9 bits floating point representation of 16 bits signal is optimal in a sense that all codes are used.

TABLE 1

| Range | Number of bits | Exp | Step | Max error |
|---|---|---|---|---|
| [0, 512) | 512 | 0 | 1 | 0 |
| [512, 1024) | 512 | 1 | 1 | 0 |
| [1024, 2048) | 512 | 2 | 2 | 1 |
| [2048, 4096) | 512 | 3 | 4 | 2 |
| [4096, 8192) | 512 | 4 | 8 | 4 |
| [8192, 16384) | 512 | 5 | 16 | 8 |
| [16384, 32768) | 512 | 6 | 32 | 16 |
| [32768, 65536) | 512 | 7 | 64 | 32 |

In the example of FIG. 7, front format converter 50 consists of two sub-blocks: a front color space converter (CSC) 51 and a front LUT 52, where the two sub-blocks are exchangeable, i.e. front LUT 52 could be before front CSC 51 in FIG. 7. Front CSC 51 converts incoming video signals from the input color space into a color space preferred for video processing. The processing color space is not limited to the standard spaces described above. Accordingly, a more complicated implementation than a 3×3 matrix multiplication may be required depending on color spaces involved in the conversion. For example a non-linear conversion to CIE L*a*b* and CIE L*u*v* color spaces may be used.

Front LUT 52 converts signal from the $N_b$ bits input light space into a $E_b \cdot M_b$ bits processing light space. Each of the input and the processing light spaces may be non-linear or linear, depending on the format of incoming signal and the preferred format for video processing.

The conversion from the non-redundant $E_b \cdot M_b$ bits to a redundant $E_b' \cdot M_b'$ bits FP format at stage 53 prepares signals for image processing. The redundant FP format has one extra bit for mantissa compared to the non-redundant format. This simplifies the video processing circuitry. A drawback of the redundant format is that the same number may be represented with two different codes.

Let e·m be a number in the non-redundant $E_b \cdot M_b$ format and e'·m' be the same number in the redundant $E_b' \cdot M_b'$ format. Then the conversion gives:

$$m' = \begin{cases} m, & e = 0 \\ m + 2^{M_b}, & e > 0 \end{cases} \text{ and } e' = \begin{cases} 0, & e = 0 \\ e - 1, & e > 0 \end{cases} \quad (36)$$

The conversion of equation (36) can be incorporated into the video processor 70 that processes data via geometry and color correction means described above. Basic algorithm for the geometric correction is two dimensional signal filtering by means of a MAC function. The formula for MAC of video signal in the redundant FP format is revised from equation (8) to that shown below:

$$O = \frac{\sum_{i=0}^{K} I_i k_i}{\sum_{i=0}^{K} k_i} = \frac{\sum_{i=0}^{K} 2^{e_i'} m_i' k_i}{\sum_{i=0}^{K} k_i} \quad (37)$$

where $k_i$ is a filter's coefficient, K is the number of pixels to be accumulated, and $e_i' \cdot m_i'$ is a signal's value in the redundant FP format. Similarly for the color correction, the equation (11) can either be evaluated using the FP format or an integer format. In one example, the output of the filter and the color correction is in integer format, denoted $N_b'$. This has the benefit of not doing a second conversion to FP after the normalization in equation (37). The only conversion to FP is that in the front LUT.

The $N_b'$ bits pixel value in the processing light space needs to be converted to non-redundant $E_b \cdot M_b$ FP format in the next sub-block 63. This serves to reduce the number of bits $N_b'$ for hardware optimization, prior to the final format conversion.

The steps involved in going from $N_b'$ to $E_b \cdot M_b$ for value $I_i$ are outlined below:
 a. find exponent $e_i = 2^{E_b}$–count of leading zeros for $I_i$,
 b. clip exponent $e_i = [2, 2^{M_b}]$
 c. find mantissa (normal rounding) $m_i = (I_i + 2^{e_i-1}) >> e_i$
 d. find $I_i' = m_i << e_i$
 e. clip to $[0, 2^{N_b'}-1]$
 f. find exponent $e_i' = 2^{E_b}$–count of leading zeros for $I_i'$
 g. clip exponent $e_i' = [2, 2^{M_b}]$
 h. find mantissa $m_i' = I_i' >> e_i'$
 i. correct mantissa $e_i' = e_i' - 2$
 j. remove hidden bit: if $m_i'$ & $2^{M_b+1}$, then $m_i' = m_i'$ & $(2^{M_b+1}-1)$ and $e_i' = e_i' + 1$ Following the conversion to $E_b \cdot M_b$ FP format, the video signal is converted into the final format in a light space acceptable by the display device, in back format converter 60. The front converter also consists of two exchangeable sub-blocks 61 and 62. The back LUT 62 converts the signal from the processing light space into the output light space. Any of the processing and output light spaces may be linear or non-linear. Moreover, the back LUT 62 converts the signal from the non-redundant $E_b \cdot M_b$ FP format to a $N_b''$ bits format. The back CSC 61 stage transforms the signal into a desirable color space, which is not limited to the standard spaces described above. Accordingly, a more complicated implementation than a 3×3 matrix multiplication may be required depending on color spaces involved in the conversion.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method for correcting color distortions in an image, said method comprising:
    (a) obtaining input image data in a first format color space;
    (b) converting the input image data from the first format color space into a second format color space;
    (c) separately correcting color distortions in the converted image data for each color component, using a color correction transformation, in the second format color space and thereby generating color distortion corrected data, wherein the corrected color component depends on all color components and the color correction transformation is represented by surface functionals,
    such that a displayed image based on the color distortion corrected data is visually free of color distortions.

2. The method of claim 1, wherein the second format color space is gamma de-compensated.

3. The method of claim 1, wherein the first format color space is gamma compensated.

4. The method of claim 1, wherein the color corrected data in the second format color space is converted to a third format color space for display.

5. The method of claim 1, wherein the color distortions are caused by at least one of an image acquisition device, a broadcasting system, and a display system.

6. The method of claim 5, wherein the color distortions include those caused by at least one of compression, coding, transmission, decoding, and decompression.

7. The method of claim 1, wherein correcting color distortions depends on specific regions of the image.

8. The method of claim 7, wherein the specific regions are specified by at least one pixel.

9. The method of claim 1, further correcting luminance non-uniformities for each color component.

10. The method of claim 1, further correcting chrominance non-uniformities for each color component.

11. The method of claim 1, wherein the color corrected values are adjusted by applying an offset function and a gain function.

12. The method of claim 11 wherein said offset function and gain function are represented as warp maps.

13. The method of claim 1, wherein the color corrected values are further adjusted by applying a soft-clipping function.

14. The method of claim 1, further applying filtering to obtain pixel color values.

15. The method of claim 1, wherein color correction is performed using a floating point representation in the second format color space.

16. The method of claim 1, further using a floating point representation format according to required precision and hardware resources.

17. The method of claim 1, wherein format conversion is achieved using look-up-tables.

18. A method for correcting color distortions in an image having color data points, said method comprising:
   (a) obtaining grid transformation data relating distorted color data points to corrected color data points, said grid transformation data spanning color space and image coordinate space,
   (b) dividing the displayed image into a plurality of patches wherein size of each patch varies depending on the region of the displayed image,
   (c) representing the grid transformation data corresponding to each patch using surface functionals,
   (d) separately applying the surface functionals for said each patch in the image for each color component, wherein the corrected color component depends on all color components, to correct for color distortions in the image data.

19. The method of claim 18, further dividing color space and image coordinate space into patches according to distortion complexity level in each patch, and representing the grid transformation data in each patch for each color component with a surface functional.

20. The method of claim 18, further comparing the difference between color values rendered by a surface functional and color values rendered by the grid transformation data against a pre-set tolerance level, and further dividing the patches if the difference is greater than the pre-set tolerance level.

21. The method of claim 18, wherein the color distortions are caused by at least one of an image acquisition device, a broadcasting system, and a display system.

22. The method of claim 21, wherein the color distortions include those caused by at least of compression, coding, transmission, decoding, and decompression.

23. A method for correcting an image having color components, in an image display system having geometric and color distortions, said method comprising:
   (a) obtaining image data for each of said color components;
   (b) correcting for geometric distortions in the image display system for each color component independently and thereby generating geometrically corrected image data,
   (c) separately correcting for color distortions in the geometric corrected image data for each color component using a color correction transformation, to generate geometric distortion corrected and color distortion corrected image data, wherein the corrected color component depends on all color components and the color correction transformation is represented by surface functionals,
   such that a displayed image based on the geometric distortion corrected and color distortion corrected image data is visually geometric distortion free and color distortion free.

24. An electronic system for correcting color distortions in an image, said system compromising:
   (a) an interface adapted to obtain image data in a first format color space;
   (b) conversion means adapted to convert the input image data from the first format color space into a second format color space;
   (c) color correction means adapted to correct color distortions in the image data separately for each color component using a color correction transformation in the second format color space and thereby generating color distortion corrected data, wherein the corrected color component depends on all color components and the color correction transformation is represented by surface functionals,
   such that a displayed image based on the color distortion corrected data is visually free of color distortions.

25. The electronic system of claim 24, further adapted to make correcting color distortions depend on specific regions of an image.

26. The electronic system of claim 25, wherein the specific regions are specified by at least one pixel.

27. The electronic system of claim 24, further adapted to correct luminance non-uniformities for each color component.

28. The electronic system of claim 24, further adapted to correct chrominance non-uniformities for each color component.

29. The electronic system of claim 24, further adapted to obtain color corrected values by applying an offset function and a gain function.

30. The electronic system of claim 29, further adapted to represent the offset function and the gain function as warp maps.

31. The electronic system of claim 24, further adapted to adjust color corrected values by applying a soft-clipping function.

32. The electronic system of claim 24, further adapted to apply filtering to obtain pixel color values.

33. The electronic system of claim 24, further adapted to perform format conversion using look-up-tables.

* * * * *